May 14, 1957 — E. WILDHABER — 2,791,919
LOCKING DIFFERENTIAL
Filed June 27, 1950 — 4 Sheets-Sheet 1

PRIOR KNOWN CONSTRUCTION
FIG. 1.

INVENTOR.
ERNEST WILDHABER
BY
*B. Eshlinger*
ATTORNEY

May 14, 1957  E. WILDHABER  2,791,919
LOCKING DIFFERENTIAL
Filed June 27, 1950  4 Sheets-Sheet 2

INVENTOR.
ERNEST WILDHABER
BY
ATTORNEY

May 14, 1957    E. WILDHABER    2,791,919
LOCKING DIFFERENTIAL
Filed June 27, 1950    4 Sheets-Sheet 3

INVENTOR.
ERNEST WILDHABER
BY
ATTORNEY

May 14, 1957     E. WILDHABER     2,791,919
LOCKING DIFFERENTIAL

Filed June 27, 1950     4 Sheets-Sheet 4

INVENTOR.
ERNEST WILDHABER
BY
ATTORNEY

United States Patent Office 2,791,919
Patented May 14, 1957

---

2,791,919

LOCKING DIFFERENTIAL

Ernest Wildhaber, Brighton, N. Y.

Application June 27, 1950, Serial No. 170,610

19 Claims. (Cl. 74—714)

The present invention relates to gear differentials and particularly to gear differentials of the locking and of the partially-locking type.

In conventional gear differentials, the planet pinions are mounted in a carrier or spider which must be accurately machined to hold the planet pinions in correct angularly-spaced relationship so that each will mesh properly with the side gears of the differential and bear its proper share of the load. In conventional gear differentials, moreover, split differential housings are required, if more than two planet pinions are used; and, of course, the two parts of the housing have to be bolted together to assemble the differential.

When one of the drive wheels of an automotive vehicle gets into the mud or on an icy spot it loses its traction and ordinarily it will start to spin or race so that the driving power transmitted to the other wheel will be considerably diminished. Under bad mud or ice conditions, there may not be enough traction to move the vehicle. For this reason, various types of differentials have been proposed, in which one of the side gears of the differential is locked against rotation, or partially locked against rotation, relative to the driving member, when slippage occurs, so that the slippage may be halted and transmission of power may be achieved. In one such prior proposal (see U. S. Patent No. 1,717,784 to Johnson), a planet arrangement is used which spins around rapidly upon differentiation so that substantial friction develops, whereby a locking effect is obtained. A number of proposals are also known for obtaining locking action by using the differential as a gear pump and obstructing the displacement of oil by this pump so that pressures are obtained large enough to have a locking effect when one wheel tends to spin. With such arrangements the displacement of oil, at the relative wheel speeds where locking should occur, is small so that very high pressures are required to attain any beneficial locking effect.

The present invention has among its objects to provide a differential which will be simple in constructon, of great strength, of low cost and which will properly divide power among the various planets of the differential without requiring unduly close tolerances.

Another object of the invention is to provide a differential which can be built with a minimum outside diameter to transmit a given torque, and in which the diameter can be reduced by increasing the axial length of the differential.

A further object of the invention is to provide a differential without the customary planet carrier, where the planet carrier can be replaced by a much simpler central rotary member.

A further object of the invention is to provide a differential in which more than two planets may be employed without requiring a split differential housing.

Another object of the invention is to provide an improved construction for a split-housing type differential.

Another object of the invention is to provide a differential of the locking type where the degree of locking is controlled through differences in tooth numbers of the gears of the differential and where complete locking or partial locking is attainable with the same basic design.

Another object of the invention is to provide a differential, especially suited for partial locking by internal hydraulic braking, and in which smooth sufficient locking is attained without excessive pressures.

Still another object of the present invention is to provide a differential in which much more displacement of oil at a given relative speed of the two driven shafts may be attained than in known differentials using hydraulic pressure by causing the planets to revolve much faster than in prior constructions.

A still further object of the invention is to provide a partially locking differential where internal braking is attained through the displacement of oil in the gear teeth in which a supply of oil is used in the gear teeth separate and different from the oil or lubricant used on the drive gears of the vehicle.

Other objects of the invention will be apparent hereinafter from the specification and from the recital of the appended claims.

Figure 1:
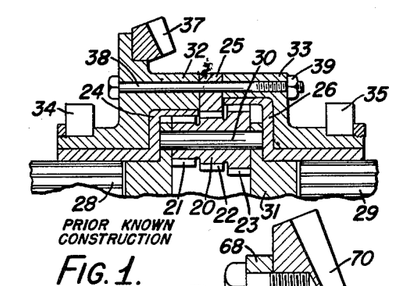
Fig. 1 is a fragmentary axial section showing a known proposal for construction of a partially locking differential.

Referring first to Fig. 1, this figure shows a previous proposal for a partially locking type differential. In this proposal each planet member 20 of the differential was to be composed of three integral pinions 21, 22 and 23 of different tooth numbers and different diameters. The three pinions 21, 22 and 23 of each planet member were intended to mesh, respectively, with three internal gears 24, 25 and 26. The internal gear 25 was to be the driver of the differential while the internal gears 24 and 26 were to be the side gears. The side gears 24 and 26 were to have splined connections with the two axle shafts 28 and 29, respectively. The planet members 20 were to be journaled on pins or shafts 30 secured at opposite ends in the planet carrier 31. The drive gear 25 was to be secured between the two halves 32 and 33 of the differential housing which were to be mounted in conventional fashion on anti-frictcion bearings 34 and 35. The rear axle drive gear, here shown as a bevel or hypoid gear 37, was to be secured in conventional fashion to the differential housing whose parts 32 and 33 were to be fastened together in conventional manner by bolts 38 and nuts 39.

This type of differential had certain principles of operation which may be helpful to an understanding of the present invention and for that reason is referred to here. In the differential of Fig. 1, rotation of the planet member 20 causes the internal side gear 24 to turn at a slower rate than the internal driver 25; and it causes the internal side gear 26 to turn at a faster rate. Relative to the driver 25, therefore, the two side gears 24 and 26 turn in opposite directions as required for differential action. To obtain this action, the planet members 20 should revolve inside of the driver at a comparatively rapid rate, namely, at the rate at which the driver turns when the planet axis is held stationary. This large, rapid planetary motion results in friction which tends to lock the differential. Hence this differential would tend to be partially locking in operation and therby tend to prevent slippage of either of the vehicle drive wheels connected to the axle shafts 28 and 29.

To attain equal distribution of the load on the several planets 20 of the differential, these members 20 should be exactly alike. Moreover, the three pinions 21, 22, and 23 of each planet member 20 would have to be in exact alignment. Furthermore, the tooth thicknesses of the pinions 21 of the several planet members 20 of the differential should be alike, as should also the tooth thicknesses of the several planet pinions 22, and the tooth thicknesses of the several planet pinions 23. These requirements are very difficult and costly to attain in production. The cost of this differential is further increased by reason of the fact that two different blanks are required for the two side gears 24 and 26 and by reason of the fact that different diameters of seats have to be provided in the differential housing for these two side gears.

As contrasted with this prior proposal, in a differential constructed according to the present invention each planet member comprises a single wide-faced cylindrical pinion 40 (Fig. 2) which is of the same diameter, same tooth number and same tooth thickness throughout its length. Each planet pinion 40 meshes with three internal gears 41, 42 and 43. These internal gears all have different numbers of teeth. The internal gear 42 is the driver of the differential; and the internal gears 41 and 43 are the side gears. The side gears have splined connections with the axle shafts 45 and 46. The side gears 41 and 43 have, respectively, the smallest and the largest tooth numbers, while the internal drive gear 42 has a number of teeth intermediate the numbers of teeth in the side gears. This construction is possible under the well-known gear principles, namely, that the gear diameters do not necessarily determine the tooth ratio. The pitch points, that is, the points of rolling contact on the three different gear pairs 40—41, 40—42 and 40—43 are simply at different radial positions. In other words, the single pinion 40 of Fig. 2 can be made to act like the three pinions of Fig. 1 as regards transmitted motion.

Figure 2:
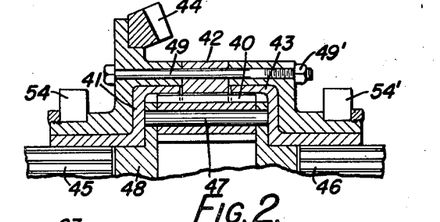
Fig. 2 is a corresponding section of a differential constructed according to one embodiment of this invention and illustrating particularly the principles underlying the present invention.

On a single pinion 40, each tooth quite naturally is aligned throughout its length so that no problem is incurred in this respect. Also, the tooth thicknesses of the several planet members can be held more easily where each planet member is a single pinion having the same number of teeth along its whole length than where each planet member has three different numbers of teeth along its length. Moreover, with the present invention the cost is reduced so far as machining operations are concerned on the differential housing because the internal side gears 41 and 43 can be made from blanks of the same size and because seats of the same diameter can be provided for these side gears in the two parts of the differential housing. The two parts of the differential housing are secured together in conventional fashion by bolts 49 and nuts 49′ and are mounted in conventional fashion on anti-friction bearings 54 and 54′. 44 is the conventional axle drive gear.

A further saving in cost is achieved with the present invention because a single machine set-up is all that is required on each planet pinion. Furthermore, in the present invention, another improvement can be attained by making the driver 42 wider than the side gears 41 and 43. This increases the load capacity since the driver carries the combined load of the two side gears.

In the embodiment of the invention shown in Fig. 2, the planet pinions 40 are journaled on studs or shafts 47 which are secured at opposite ends in the differential spider or planet carrier 48.

A further improvement of the present invention consists in eliminating the planet carrier. A modification of the invention showing this achievement is illustrated in Fig. 3.

In this embodiment of the invention, the planet pinions are denoted at 50. The internal gears, which mesh with these planet pinions are designated at 51, 52, and 53, respectively. The internal gear 52 is the driver. The internal gears 51 and 53 are the side gears. The side gears 51 and 53 have splined connections with the axle shafts 55 and 56, respectively. Here, instead of mounting the pinions 50 in a spider or pinion carrier, I insert a central gear 57. This central gear floats. It is not driven from any outside source nor is it held radially by anything but the several planet pinions 50. It contacts with the planet pinions 50 simultaneously on both sides of its teeth and keeps the pinions 50 in properly spaced positions.

The bearings for the planet pinions in a conventional differential have to be spaced very accurately in the planet carrier and have to be exactly parallel to the axis of the planet carrier as a condition for the planets to transmit equal loads. Another condition is that the planet pinions mounted in the planet carrier should be exactly alike as regards tooth thickness. By substituting a spacer gear 57 for the planet carrier according to the present invention the desired result of transmission of equal loads can be obtained with much less effort. Even pinions with moderate errors incurred through wide manufacturing tolerances, for instance, with variations in tooth thickness, are constrained by the gear 57 to transmit equal loads. If any one pinion 50 would tend to transmit more load, it would push the central gear 57 slightly toward the other pinions 50 through load unbalance until equilibrium was restored. Equilibrium exists when all the pinions 50 carry equal loads. The provision of a central spacer gear 57, therefore, constrains the planet pinions 50 to carry equal loads. The spacer gear 57 accordingly is not merely a substitute for a planet carrier but a marked improvement over a planet carrier. Moreover, it requires less space in axial direction. Also, it costs must less than a planet carrier.

Figures 3, 4, 5, 6:
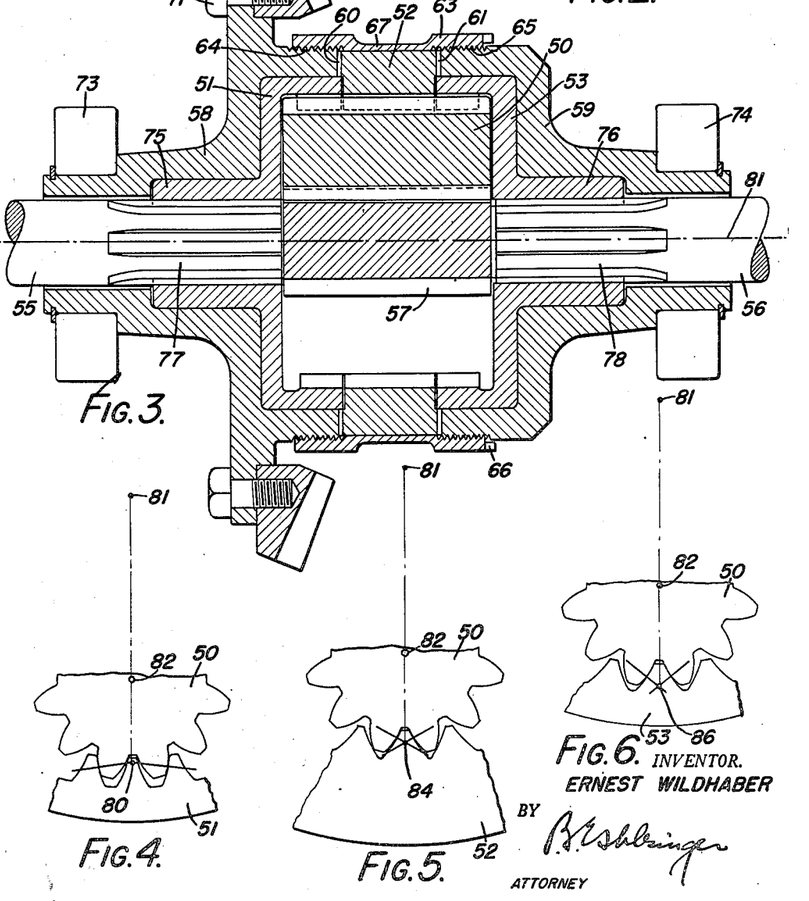
Fig. 3 is an axial section of a differential constructed according to a modification of the invention.
Figs. 4, 5 and 6 are enlarged fragmentary views showing the three different meshes of one of the planetary pinions of the differential of Fig. 3 with the three internal gears of that differential.
Figure 7:
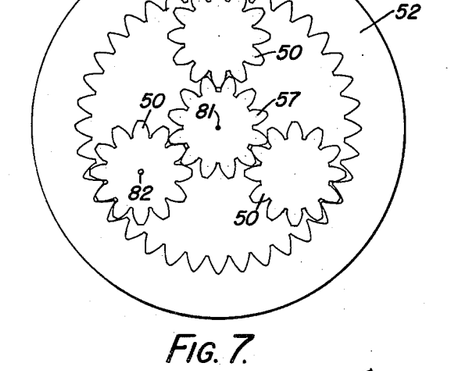
Fig. 7 is a diagrammatic end view showing the internal drive gear, the three planetary pinions, and the central holding gear of the differential shown in Fig. 3.

Another feature of the modification of the invention shown in Fig. 3 is the novel way in which the differential housing is split and is secured together. This housing comprises the two parts 58 and 59 and the internal gear 52. This gear is connected with the two side portions 58 and 59 of the differential housing by face clutch teeth 60 and 61 which may be made, for instance, according to my Patent No. 2,384,582, granted September 11, 1945. The parts are connected together by the sleeve member 63 which has spaced internally threaded portions 64 and 65 of opposite hand threading upon external correspondingly threaded portions of the parts 58 and 59 of the differential housing. The sleeve 63 may be provided with face teeth 66 at one end which can be engaged by a suitable tool for rotating it. When the sleeve is rotated the two parts 58 and 59 of the differential housing are approached axially or separated, depending on the direction of rotation of the sleeve.

Ordinarily, such large diameter threads are disliked because manufacturing tolerances are apt to cause one-sided pressure, and uneven distribution of the pressure around the circumference. This objection is overcome in the present instance by providing in the sleeve 63 a connecting portion 67 between the threads 64 and 65 which is of thinner cross-section than the threaded end portions of the sleeve. The tightening operation on the parts 58 and 59 proceeds until the portion 67 of the sleeve is slightly stretched beyond its elastic limit. This stretching equalizes the pressure around the entire periphery of the sleeve.

The part 58 of the differential housing has a flange 68 to which the bevel or hypoid axle drive gear 70 is secured by screws 71. The housing is journaled in the two bearings 73 and 74 in conventional manner. The two internal side gears 51 and 53 of the differential may be cut from identical blanks. They have hub portions 75 and 76 which are journaled in the housing parts 58 and 59 and which have splined connections with the splined portions 77 and 78 of the axle shafts 55 and 56.

The planet pinions 50 may have any suitable known form of tooth. The internal gears 51, 52 and 53 are simply generated conjugate to the teeth of the pinions. This can be done, for instance, with a gear shaper cutter representing the pinion, or with a form tool whose profile fits a tooth space of the gear to be cut. The teeth may be of the well known involute form, but the invention is not confined to use of involute teeth.

Figs. 4, 5 and 6 are more or less diagrammatic views illustrating the mesh at different points along the length of a planet pinion 50 showing how a single pinion 50 can mesh properly with the several internal gears 51, 52 and 53. The pitch point 80 in Fig. 4, which is the point of rolling contact of a pinion 50 and the internal gear 51, lies on the line of centers 81—82 of the internal gear and the pinion in a position such that the pitch radii 82—80 and 81—80 are proportional to the tooth numbers of the gear 51 and pinion 50. The pitch point 80 lies on the pitch circle of the gear 51 and, of course, also on the pitch circle of the pinion 50, for this mesh. This relationship is well known; and the location of the pitch point 80 between this pair can, therefore, readily be determined. In similar manner the locations of the pitch point 84 of the pair 50—52, and of the pitch point 86 of the pair 50—53, can be determined. The pitch points 84 and 86 lie on the pitch circles of the gears 52 and 53, respectively, for their respective meshes with the pinion 50. The gears 51, 52, and 53 have, therefore, different pitch circles. The pitch point 80 is seen to be near the base of the pinion teeth. The pitch point 84 is near the middle of the tooth height; and the pitch point 86 is near the outside of the pinion teeth. The pitch circle of gear 51 is smaller than the pitch circle of gear 52; and the pitch circle of gear 53 is larger than the pitch circle of gear 52. As on all involute gears, the lines of action are straight and pass through the pitch points. All these teeth have correct tooth action.

The pitch circle of the gear 52 at the operative point, namely, at the pitch point 84, lies radially between the pitch circles of the gears 51 and 53. Therefore, the gears 51 and 53 possess a mechanical leverage on each side of the pitch circle of the gear 52.

In the drawings, the pinions 50 are shown as having twelve teeth. The drive gear 52 has thirty-six teeth, the internal gear 51 has thirty-nine teeth and the internal gear 53 has thirty-three teeth. The spacer gear 57 is here identical with the pinions 50 and has twelve teeth.

Obviously, the tooth numbers of the internal gears 51, 52 and 53 should be so chosen that the pinions 50 can be assembled into mesh therewith. This is accomplished when the difference in tooth numbers between a side gear and the internal driver is divisible by the number of planets used. In the example given this difference is three. This permits using three planets 50. If the difference were four, either two or four planets might be used. The larger the difference in tooth numbers, as compared with the tooth number of the internal driver, the smaller is the locking effect achieved.

With equal differences on the two side gears 51 and 53, the side gear 51 with the larger tooth number would receive more torque than the other side gear 53 if it were not for the partial locking effect. With absolutely no friction, the torques would be proportional to the numbers of teeth of the side gears. In the example it would be proportional to thirty-nine and thirty-three, that is, thirteen to eleven. While this unbalance is wiped out by the internal friction in straight driving, its effect appears when the wheels turn relative to one another. One wheel then drives somewhat more than the other. As the wheel nearer the middle of the road is apt to stand more traction than the one running on the side, this wheel is preferably connected with the side gear 51 of larger tooth number.

In vehicles with a four wheel drive, the differential used between the drives of the front wheels and the rear wheels is usually required to split up the torque unevenly and to transmit more torque to the rear wheels than to the front wheels. When a differential constructed according to the present invention is used in a four wheel drive, this may be accomplished in one of two ways. One way is to use a large enough difference in tooth numbers to obtain side gear tooth numbers in the proportion of the required torques. Another way is to use different tooth number differences on the two side gears. The torques transmitted at zero friction can be shown to be proportional to the tooth number of a side gear and inversely proportional to the difference of this tooth number from the tooth number of the internal driver. Thus, with thirty teeth in one side gear and thirty-six teeth in the internal driver, the proportion is 30/6. When the other side gear has forty teeth, the tooth number difference from thirty-six is four and the said proportion is 40/4. The torques transmitted at zero friction are then in the proportion of five to ten or one to two.

Unequal differences of tooth numbers may also be used for obtaining equal torques at zero friction. Thus, with forty-two teeth in one side gear and forty-eight teeth in the internal driver, the said proportion is 42/6. When the other side gear has fifty-six teeth, the difference from forty-eight is eight and the said proportion is 56/8. Both proportions are equal to seven. The same torque is thus transmitted at zero friction through both side gears.

Other tooth numbers may be used in the internal gears, for instance, twenty, twenty-four and thirty. Here the proportion 20/4 is equal to 30/6. This signifies that the same torque is transmitted to both wheels at zero friction. The last described tooth numbers are illustrated in the embodiment of Figs. 11 to 15.

Both last-named tooth combinations can have two planets only. This is because two is contained in both differences four and six. Likewise, two is the only common factor of the differences of six and eight.

Figure 8:
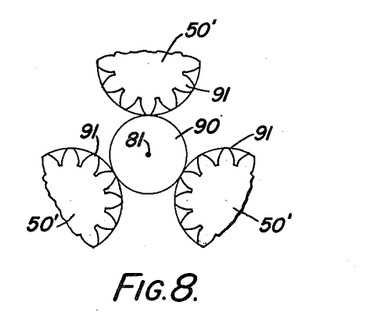
Fig. 8 is a fragmentary view, similar to Fig. 7, showing a slightly modified embodiment of the invention.

The pinions may have either straight or helical teeth. With helical teeth of a sufficiently large helix angle (Fig. 8), a roller 90 may be substituted for the spacer gear 57 at least if the driver 52 has a comparatively wide face width. The roller 90 is adapted to contact with the peripheries 91 of the several pinions 50'. Otherwise, it operates in the same way as the central gear 57 to equalize the loads on the several planet pinions 50'.

Figure 9:
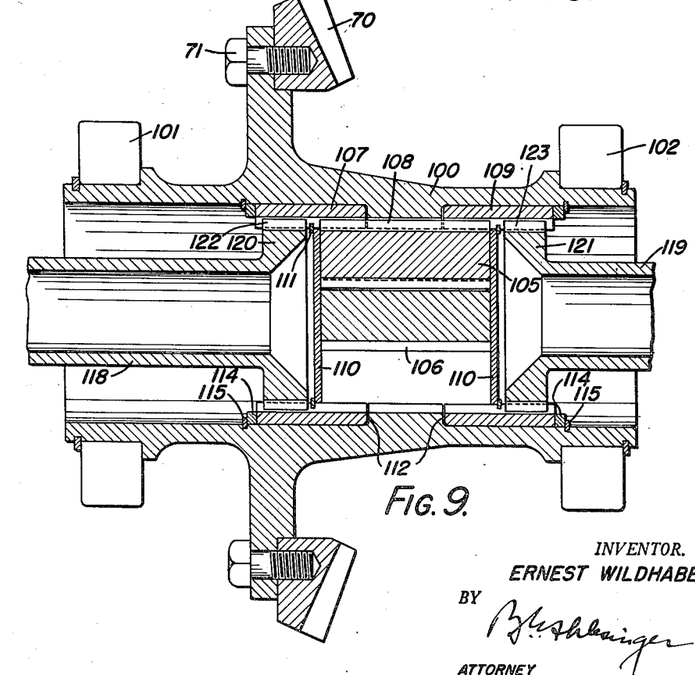
Fig. 9 is an axial section of a differential constructed according to another modification of the invention.

The differential shown in Fig. 3 has a diameter comparable to conventional differentials used on passenger cars. With the design shown and using three planet pinions the differential is very strong, stronger than it needs to be. It can be reduced in diameter, while still keeping it strong enough for the size of the drive gear 70, as shown in Fig. 9. The reduction in diameter keeps the cost and weight down further and is often desirable also for other reasons.

Fig. 9 shows one form of one-piece differential housing constructed according to this invention. The housing is denoted at 100. It is mounted on two anti-friction bearings 101 and 102. There are three planet pinions 105 in this differential which are held in position by a spacer gear 106. The planet pinions 105 mesh with internal gears 107, 108 and 109. The internal driver 108 is here formed integral with the differential housing 100. The side gears 107 and 109 are ring-shaped. Their teeth can be broached. The planets 105 and spacer gear 106 are secured axially by discs 110 which contact with the tops of the teeth of the side gears 107 and 108 and which are held in place by snap-rings 111. The internal gears 107 and 109 are rotatably mounted in the differential housing 100. One end of each of them bears against a shoulder 112 formed on the internal driver 108. On the other end each bears against a ring 114 secured in position by a snap ring 115. The internal gears 107, 108 and 109 are designed according to the principles already laid down to mesh with the pinions 105, each internal gear having a different number of teeth from the two other internal gears.

The axles 118, 119 in this embodiment of the invention are tubular with enlarged inner ends 120, 121. These ends contain external teeth 122, 123 which fit into the tooth spaces of the side gears 107 and 109, respectively, being connected in this way to the side gears. The side gears have teeth of sufficient width to permit this connection. The external teeth 122, 123 may be crowned longitudinally, if desired, to permit of compensating for inaccuracies in mountings or loading during use.

Figure 10:
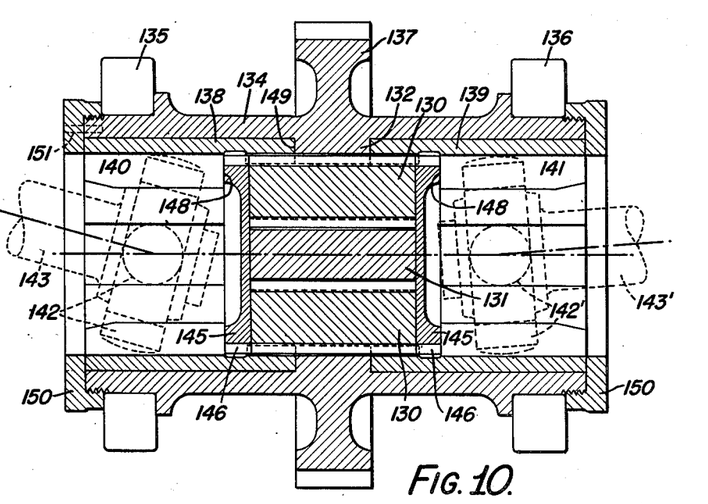
Fig. 10 is an axial section of a differential constructed according to a still further modification of the invention.

Fig. 10 shows a differential constructed according to one embodiment of this invention for use between the front wheels and the rear wheels of a vehicle with a four-wheel drive. This same type differential might also be used, however, between two axially aligned wheels. It may have two planet pinions 130 and a spacer gear 131. It has an internal driver 132 and internal side gears 138 and 139. A spur drive gear 137 is formed integral with the differential housing. The internal driver 132 is formed integral with the differential housing 134. The latter is journaled on anti-friction bearings 135 and 136.

The internal gears 132, 138 and 139 have teeth of different tooth numbers as in the previously described embodiments of the invention. The side gears 138 and 139 at their outer ends are formed with sleeve portions which have axial grooves 140 and 141, respectively. The grooves 140 may be engaged by the rollers 142 of a universal joint member 143, shown in dotted lines; and likewise the grooves 141 may be engaged by the rollers 142' of a universal joint member 143' also shown in dotted lines. The joints shown are constant velocity joints such as disclosed in my pending patent application Serial No. 141,457, filed January 31, 1950. Other types of universal joints may, however, be used instead.

A recessed plate 145 is inserted between the grooves 140 or 141, respectively, and the toothed portions of the side gears 138 and 139. These plates are assembled from the sides of the gear teeth and may have teeth 146 on their peripheries matching the tooth spaces of their side gears. Such teeth will secure the plates against rotation. The plates 145 are in contact with the shoulder 148 formed at the inner ends of the projections which bound the grooves 140 and 141. The plates 145 secure the planets 130 and the spacer gear 131 against axial movement.

The side gears 138 and 139 are journaled in the differential housing 134 and are held against axial movement by the shoulders 149, which are formed at the ends of the internal driver 132, and by the end caps 150. These end caps thread onto the differential housing 134 and serve also to secure the bearings 135 and 136 in position. They are themselves held against rotation by, for instance, pins 151.

A further feature of the invention will now be described in connection with the embodiment shown in Figs. 11 to 17 inclusive. In this embodiment the differential is used as a gear pump; and the displacement of oil is obstructed so that pressure is created and energy is consumed. Thus, a locking or internal braking effect is obtained, due largely to displacement of the oil or other liquid contained in the differential.

In most conventional differentials, the planet carrier is directly connected with the drive gear; and if one side gear is held stationary, the other side gear goes twice as fast as the planet carrier. It takes two full turns of one side gear relative to the other side gear, then, in a conventional differential to get a side gear to have mesh all around its teeth with the teeth of a planet pinion. In the differential of the present invention, the planet pinions revolve at a faster rate around the side gears, than in a conventional differential because of the difference in tooth numbers of the side gears. Hence, if a differential constructed according to the present invention is used as a gear pump, proportionately more oil is displaced per two relative turns of the side gears than would be the case with similarly-used conventional differentials. Hence, with a differential constructed according to this invention, a given pressure increase corresponds to a proportionately larger amount of energy consumed in the oil, and to a proportionately larger braking or locking effect. For this reason in a differential constructed according to the present invention an adequate braking effect is obtainable without excessive pressure increase. Hence, a differential, such as disclosed in the present application, is far better suited for internal braking with oil than conventional types of differentials with their slower mesh. A type of differential with a planet assembly movable relative to the differential housing and movable relative to each side gear gives a particularly fortunate combination when the differential is employed as a gear pump, in producing an internal braking or locking effect.

In the embodiment illustrated in Figs. 11 to 17, the internal gear driver 155 is again integral with the differential housing 156; and the internal side gears 157 and 158 are journaled in this housing. The planet pinions are denoted at 160. As before, they mesh with all three internal gears. Where the differential is intended to operate as a gear pump, coarse pitch teeth are desirable in the gears to increase the displaced volume of oil. In the embodiment illustrated, the internal driver 155 has twenty-four teeth, the side gears 157 and 158 have twenty and thirty teeth, respectively, and the planets 160 have six teeth.

Figure 11:
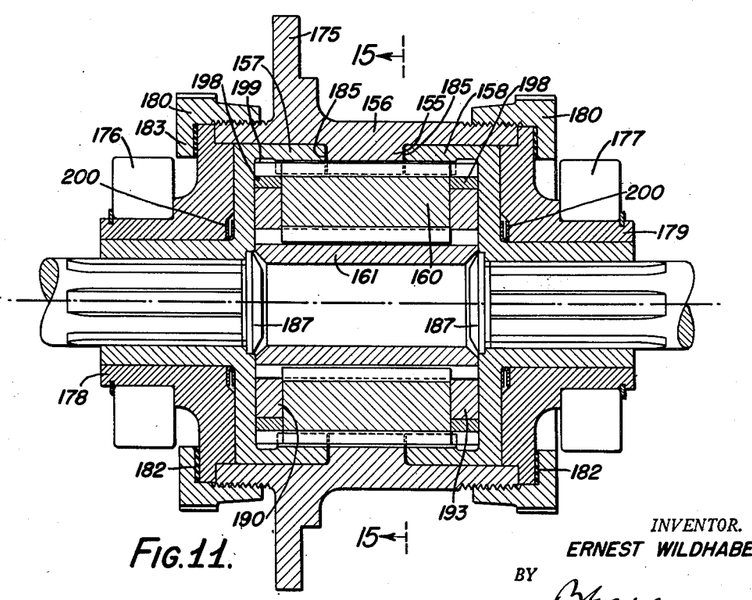
Fig. 11 is an axial section of a differential constructed according to still another modification of the invention, in which the differential is used as a gear pump and the displacement of the oil by this differential pump is obstructed to obtain an internal braking effect.

If a planet pinion 160 is turned on a fixed center to cause one turn of the internal gear 155, the two side gears 157 and 158 will make 24/20 and 24/30 turns, that is 6/5 and 4/5, respectively. For each five turns of the internal gear 155, the side gears make six and four turns, respectively, and the meshing engagement sweeps their entire circumference six and four times, respectively. This takes place while the two side gears make two turns relative to one another. In this relative motion of the side gears, the mesh of the planet pinions sweeps the side gears in a conventional type differential once only, but in the described differential of this invention in this same relative motion of the two side gears the planet pinions will sweep the side gears six and four times, respectively, and the internal driver 155 five times. The displaced volume of oil is further added to by the mesh of the planets with the central spacer gear 161. The large volume of oil displaced even at moderate relative speeds provides the desired locking effect at the desired relative speeds without excessive oil pressures.

Figures 12, 13, 14, 15, 16, 17:
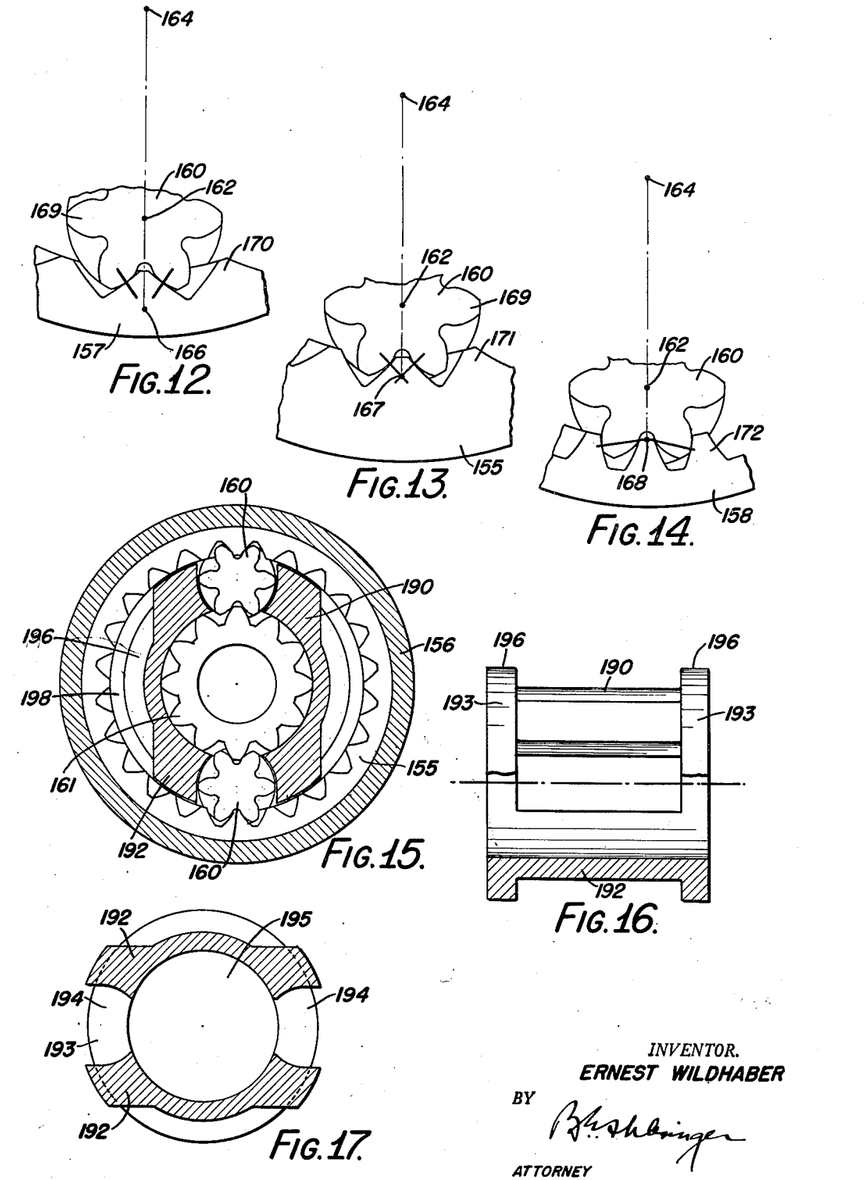
Figs. 12, 13 and 14 are enlarged fragmentary views showing the meshes between the three internal gears and a planetary pinion of the differential of Fig. 11.
Fig. 15 is a section on the line 15—15 of Fig. 11, looking in the direction of the arrows.
Fig. 16 is a partial plan view, partial axial section of the shrouding member used in the differential of Fig. 11.
Fig. 17 is a part transverse cross section, part end view of this shrouding member, with the shrouding member shown in a position rotated through ninety degrees from the position it occupies in Fig. 15.

Figs. 12, 13 and 14 show the mesh between a planet pinion 160 and the internal gears 157, 155 and 158. 162 denotes the axis of the planet pinion and 164 the common axis of the internal gears 157, 155 and 158. The pitch points are denoted at 166, 167, and 168, respectively. These are located at varying distances from the pinion centers 162 on the center line 164—162. Helical teeth 169 are provided on the pinion and meshing helical teeth 170, 171, and 172, respectively, on the three internal gears, to insure transmission of uniform motion, since on the gears 155 and 157 the tooth profile action is not long enough to carry uniform motion alone from one tooth to the next.

A novel way of mounting a differential is also shown in Fig. 11. The housing has a flange 175 for holding the drive gear of the vehicle which is not shown. The bearings 176 and 177, which rotatably support the housing, are mounted upon sleeve members 178 and 179, respectively, which are rigidly secured to the main body of the housing, each sleeve member being centered in the housing and contacting an end surface of the housing. Each sleeve member is held against said end surface by a nut 180 which threads onto the main body of the housing, a disc 182 of neoprene or other yieldable substance being interposed between the flange 183 of each nut 180 and the sleeve member. Such a disc insures an equal distribution of pressure around the periphery and also keeps the screw thread of the nut under load at all times, thereby securing the nut in position. Each side gear 157 or 158 is rotatably mounted in one of these sleeve members as well as in the housing proper and bears laterally against the inside face of said sleeve member and against a shoulder 185 formed on the housing by the ends of the internal gear 155.

Preferably, an independent supply of oil is used in the differential which is shut off from the high pressure lubricant used for the rear axle drive or other drive gear of the differential housing. The side gears 157 and 158 are sealed off at their inner ends by discs 187 which are secured to the side gears by welding.

A cage 190 (Figs. 11, 15, 16 and 17) is also preferably used for obstructing the passage of oil during the turning motion of the planets on their axes, that is, during the relative motion of the two side gears. It is a casting made in one piece. This cage should fit with sufficient looseness or play to cause the required pressure rise at the desired relative speed of the side gears. It contains a pair of opposed working portions 192 which are connected by the end flanges 193. Pockets 194 are formed between these two working portions for the two planets 160; and the central bore 195 of the cage receives the spacer gear 161. The outside surfaces 196 of the flanges 193 bear against rings 198 inserted in the internal gears 157 and 158. These rings may have teeth 199 on their peripheries to match the tooth spaces of the side gears and prevent rotation of the rings. If desired, the rings may be omitted.

Seals 200 are provided between the sleeve members 178 and 179 and the side gears 157 and 158, respectively. They are non-metallic and of U-shape in cross-section. They may be made, for instance, of neoprene, with one leg of the U bonded to the adjacent sleeve member. The other leg is pressed against the back of a side gear. A pressure rise will tend to expand the U-shape and increase the pressure between the seals and the gear surface. A seal of this character is effective even at large pressures. Any suitable known seal may be used, however, in its place.

Leakage through the screw threads engaged by the nuts 180 may be avoided by coating the threads with a known sealing medium before assembly.

With my invention, a simple and practical differential with hydraulic locking effect is feasible. In any differential partial or complete locking action is obtainable by braking the relative motion of the parts so that the mechanism tends to turn as a solid unit. When the differential is built as an oil pump, which tends to displace the enclosed oil from the entering side of the meshing gear teeth to the leaving side of the teeth, oil pressure is built up during the relative motion of the parts provided that the free flow of oil between the entering and leaving sides of the meshing gear teeth is restricted. Energy is consumed which supplies a braking effect to the relative motion, that is, a locking effect. In the differential shown in Figs. 11 to 17 inclusive the pinions 160 are shrouded by the portions 192 of the cage 190 so that there is restricted flow of oil between the entering and leaving sides of the pinion teeth.

In any differential built as an oil pump, at a given oil pressure the consumed energy and the locking effect are substantially proportional to the displaced volume of oil. This volume is much larger in differentials which contain three coaxial and relatively movable gears, like the present differential, because on differentiation the planets roll around much faster than the side gears turn relative to the differential housing. The differential of the present invention is, therefore, particularly well suited to attain a sufficient hydraulic locking effect without prohibitive oil pressures and without requiring auxiliary boosters or amplifiers.

While the invention has been described in connection with several different embodiments thereof, it is capable of further modification, and this application is intended to cover any variations, uses, or adaptations of the invention, following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described my invention, what I claim is:

1. A differential comprising a rotatable housing, an internal gear mounted coaxial with said housing and connected to said housing to rotate therewith, two internal side gears rotatably mounted in said housing at opposite sides, respectively, of the first-named internal gear and coaxial therewith, each of said internal gears having a tooth number different from the tooth numbers of the two other internal gears, a planetary pinion adapted to mesh with all three internal gears with its axis eccentric of the common axis of said three internal gears, said pinion and gears having helical teeth, and means for maintaining said pinion in mesh with said internal gears.

2. A differential comprising a housing, three coaxial internal gears of substantially the same inside diameter and rotatable relative to one another, a plurality of planetary pinions, each of which is adapted to rotate about an axis eccentric of the common axis of said internal gears and to revolve about said common axis upon rotation and each of which has a single set of teeth and is adapted to mesh with all of said internal gears to transmit torque between said internal gears, and a central rotary member disposed centrally of said pinions and centered solely by engagement with all of said pinions for maintaining all said pinions in mesh with said internal gears.

3. A differential comprising a housing, three coaxial internal gears of substantially the same inside diameter and rotatable relative to one another, a plurality of planetary pinions, each of which is adapted to rotate about an axis eccentric of the common axis of said internal gears and to revolve about said common axis upon rotation and each of which has a single set of teeth and is adapted to mesh with all of said internal gears to transmit torque between said internal gears, and a central gear meshing with all said planetary pinions and centered solely by said pinions for maintaining said pinions in mesh with said internal gears.

4. A differential comprising a rotatable housing, an internal gear connected coaxially with said housing to rotate therewith, two internal side gears rotatably mounted in the housing at opposite sides, respectively, of the first-named internal gear and coaxial therewith, each of said internal gears having a different number of teeth from the two other internal gears, a plurality of planetary pinions, each of which is adapted to rotate about an axis eccentric of the common axis of said internal gears and to revolve about said common axis upon rotation and each of which has a single set of teeth and is adapted to mesh with all three internal gears, and a spacer gear disposed centrally of said pinions and meshing with all said pinions for maintaining said pinions in mesh with said internal gears.

5. A differential structure including a rotatable split housing having at least two parts, and a sleeve threading onto said two parts with two threaded portions which are inclined to one another and which engage said two parts, respectively, said sleeve having a portion of thinner section between said two threaded portions which is adapted to stretch for equalizing the pressure around the periphery of said sleeve.

6. A differential structure including a rotatable split housing having at least two parts, and a sleeve threading onto said two parts with two threaded portions which are of opposite hand, respectively, said sleeve having a portion of thinner section between said two threaded portions to stretch for equalizing the pressure around the periphery of said sleeve.

7. A differential comprising a rotatable housing having two coaxial side parts, an internal gear disposed between said two side parts and coaxial therewith and forming part of said housing, a sleeve for holding said two side parts and internal gear together, said sleeve threading onto the two parts of said housing with two threads which are inclined to each other, said sleeve having a portion of thinner section between said two threads for stretching, two internal side gears rotatably mounted in said housing at opposite sides, respectively, of said first-named internal gear and coaxial with said first-named internal gear, each internal gear having a different number of teeth from the other two internal gears, and a plurality of planet pinions, each of which is adapted to rotate about an axis eccentric of the common axis of said internal gears and to revolve about said common axis upon rotation and each of which is adapted to mesh with all three internal gears, and means for maintaining said pinions in mesh with said internal gears.

8. A differential comprising a rotatable housing having a flange-like projection thereon, a drive gear rigidly secured to said projection, two side gears rotatably mounted in said housing, a plurality of planetary pinions meshing with said side gears, means for transmitting torque between said housing and said side gears through said pinions, and means for rotatably supporting said housing comprising at least one sleeve centered on said housing and contacting with a plane end face of said housing, a flanged nut threaded onto said housing for pressing said sleeve against said housing, an elastic ring interposed between the flange of said nut and said sleeve, and a bearing on said sleeve.

9. A differential comprising a closed rotatable housing, an internal gear coaxial with said housing and connected to said housing to rotate therewith, two internal side gears rotatably mounted in said housing at opposite sides, respectively, of the first-named internal gear and coaxial therewith, a plurality of planetary pinions, each of which is adapted to rotate about an axis eccentric to the common axis of said internal gears and to revolve about said common axis upon rotation and each of which is adapted to mesh with all three internal gears, means for maintaining said pinions in mesh with said internal gears, said housing being adapted to contain oil, and means for obstructing free flow of oil between the different zones of mesh of said pinions and gears to build up pressure increasingly with increased relative speed of said side gears.

10. A differential comprising a closed rotatable housing, an internal gear coaxial with said housing and connected to said housing to rotate therewith, two internal side gears rotatably mounted in said housing at opposite sides, respectively, of the first-named internal gear and coaxial therewith, a plurality of planetary pinions, each of which is adapted to rotate about an axis eccentric to the common axis of said internal gears and to revolve about said common axis upon rotation and each of which is adapted to mesh with all three internal gears, a gear disposed centrally of said pinions and meshing with all of said pinions to maintain said pinions in mesh with said internal gears, said housing being adapted to contain oil, and a cage member partially enclosing said pinions and last-named gear to obstruct free flow of oil between the different zones of mesh of said pinions and gears to build up pressure increasingly with increased relative speed of said side gears.

11. A differential comprising a closed, rotatable housing, a gear coaxial with said housing and rigidly secured thereto, two side gears rotatably mounted in the housing at opposite sides, respectively, of said first-named gear, a planet assembly comprising planet pinions operatively interconnecting said gears, said planet assembly being movable relative to said housing and relative to said side gears, said housing being adapted to contain oil, and means for obstructing free flow of oil between the different zones of mesh of the gears and pinions to build up pressure increasingly with increased relative speed of said side gears.

12. A differential comprising a closed, rotatable housing having a drive gear secured thereto, a gear coaxial with said housing and rigidly secured thereto, two side gears rotatably mounted in the housing at opposite sides, respectively, of the second gear, a planet assembly comprising planet pinions operatively interconnecting said second gear and the side gears, said planet assembly being adapted to revolve relative to said housing and relative to said side gears, said housing being adapted to contain oil which is separate from the supply of lubricant for said drive gear, and means for obstructing free flow of oil between different zones of mesh of the planet pinions with said side gears to build up pressure increasingly with increased relative speed of said side gears.

13. A differential comprising a closed, rotatable housing, an internal gear secured coaxially with said housing to rotate therewith, two internal side gears rotatably mounted in said housing at opposite sides, respectively, of the first-named internal gear and coaxial therewith, each of said internal gears having a different number of teeth from the two other internal gears, a plurality of planetary pinions, each of which is adapted to rotate about an axis eccentric of the common axis of said internal gears and to revolve about said common axis upon rotation and each of which is adapted to mesh with all three internal gears, means for maintaining said pinions in mesh with said internal gears, said housing being adapted to contain oil, and means for obstructing free flow of oil between the different zones of mesh of said pinions and gears to build up pressure increasingly with increased relative speed of said side gears.

14. A differential comprising a closed, rotatable housing, an internal gear secured coaxially with said housing to rotate therewith, two internal side gears rotatably mounted in said housing at opposite sides, respectively, of the first-named internal gear and coaxial therewith, each of said internal gears having a different number of teeth from the two other internal gears, a plurality of planetary pinions, each of which is adapted to rotate about an axis eccentric of the common axis of said internal gears and to revolve about said common axis upon rotation and each of which is adapted to mesh with all three internal gears, a spacer gear disposed centrally of said pinions and meshing with all said pinions for maintaining said pinions in mesh with said internal gears, and a cage partially enshrouding said pinions and spacer gear to obstruct free flow of oil between the different zones of mesh of said pinions, spacer gear, and internal gear to build up pressure increasingly with increased relative speed of said side gears.

15. A differential comprising a rotatable housing, two side gears rotatably mounted in said housing and coaxial therewith, a plurality of planet pinions meshing with said side gears and having their axes eccentric of the common axis of the side gears and housing, and a spacer gear disposed centrally of said pinions and meshing with all said pinions to maintain said pinions in mesh with the side gears.

16. A drive comprising a rotatable housing, a drive gear secured thereto, an internal gear secured coaxial with said housing to rotate therewith, two internal side gears rotatably mounted in said housing at opposite sides, respectively, of the first-named internal gear and coaxial therewith, each of said internal gears having a different number of teeth from the two other internal gears, a plurality of planetary pinions, each of which is adapted to rotate about an axis eccentric of the common axis of said internal gears and to revolve about said common axes upon rotation and each of which is adapted to mesh with all three internal gears, means for maintaining said pinions in mesh with said internal gears, and two tubular axles, each of which has an enlarged head at its inner end which has peripheral gear teeth to engage in the tooth spaces of said two side gears, said side gears having tooth lengths so as to mesh simultaneously with the planetary pinions and the teeth of said axles.

17. A differential comprising a rotatable housing, an internal gear connected to said housing to rotate therewith, two internal gears rotatably mounted in said housing coaxial therewith, each of said three internal gears having a different tooth number, a plurality of planet pinions, each of which meshes with all three of said internal gears, and antifriction means for maintaining said pinions in mesh with said internal gears, said means being centered solely by said planets.

18. A differential comprising a rotatable housing, an internal gear connected to said housing to rotate therewith, two internal gears rotatably mounted in said housing coaxial therewith, each of said three internal gears having a different tooth number, a plurality of identical planet pinions disposed inside said internal gears, each of said pinions having a single set of teeth and meshing with all three of said internal gears, and rolling means for exerting radial pressure on said pinions to maintain them in mesh with said internal gears, said rolling means being centered solely by said pinions.

19. A differential comprising a rotatable housing, an internal gear connected to said housing to rotate therewith, two internal gears rotatably mounted in said housing coaxial therewith, each of said three internal gears having a different tooth number, a plurality of identical planet pinions disposed inside said internal gears, each of said pinions having a single set of teeth and meshing with all three of said internal gears, and a cylindrical roller for exerting radial pressure on said pinions to maintain them in mesh with said internal gears, said roller contacting with the peripheries of all said pinions and being centered solely by said pinions.

References Cited in the file of this patent

UNITED STATES PATENTS

| | | |
|---|---|---|
| 376,528 | Kite | Jan. 17, 1888 |
| 476,101 | Thomson | May 31, 1892 |
| 554,658 | Craig | Feb. 18, 1896 |
| 810,444 | Theil | Jan. 23, 1906 |
| 1,268,131 | Ledwinka | June 4, 1918 |
| 1,323,245 | Borkes | Dec. 2, 1919 |
| 1,354,475 | Elbortz | Oct. 5, 1920 |
| 1,431,167 | McCollum | Oct. 10, 1922 |
| 1,615,207 | Alexander | Jan. 25, 1927 |
| 1,632,571 | Watson | June 14, 1927 |
| 1,717,784 | Johnson | June 18, 1929 |
| 1,723,327 | Bronander | Aug. 6, 1929 |
| 1,859,245 | Remington | May 17, 1932 |
| 2,007,670 | Zubaty | July 9, 1935 |
| 2,043,261 | Neuland | June 9, 1936 |
| 2,102,973 | Porsche | Dec. 21, 1937 |
| 2,187,843 | Rzeppa | Jan. 23, 1940 |
| 2,420,526 | Dixon | May 13, 1947 |

FOREIGN PATENTS

| | | |
|---|---|---|
| 364,767 | France | June 6, 1906 |